April 12, 1966  H. FIEDLER ETAL  3,245,375
POINTER MEASURING INSTRUMENT
Filed May 14, 1964

INVENTORS
HERMANN FIEDLER
HEINRICH HENSS

BY *Ernest J. Montague*

ATTORNEY.

3,245,375
POINTER MEASURING INSTRUMENT
Hermann Fiedler, Langen, Oberlinden, and Heinrich Henss, Oberhochstadt, Germany, assignors to VDO Tachometer Werke Adolf Schindling GmbH, Frankfurt, Main, Germany, a corporation of Germany
Filed May 14, 1964, Ser. No. 367,300
Claims priority, application Germany, May 15, 1963, V 24,063
4 Claims. (Cl. 116—129)

The present invention relates to pointer measuring instruments having a dial of transparent material, having a ground or base color, which can be illuminated from the back side and to the front side of which a dark cover layer of translucent material is applied, leaving uncovered scale symbols of the dial, and having a pointer, which stands out brightly over a ground or base color of the dial.

It is one object of the present invention to provide a pointer measuring instrument, wherein the dial and the pointer is designed such, that the readability of the measuring values is equally good at daylight or artificial room illumination, as well as at twilight or at dusk and at night in a dark room. Particularly, during the observation of instrument boards with a plurality of measuring instruments, as for instance in airplanes, the readability should be equally good under all conditions of room illumination and the multitude of instruments to be observed should not cause fatigue or physiological disturbances of the recognition ability of the observer.

As a rule, up to now, black dials with bright graduation lines, digits and symbols and a bright pointer were used for the measuring instruments of such instrument boards. For their recognition at night, the graduation lines, digits and symbols, as well as the pointer, are covered by a bright fluorescent, phosphorescent or radioactive illuminating substance. These self- and after-luminous layers required, however, an exposure to ultraviolet radiation, to keep constant their brightness. It is also well known to illuminate the dials with white digits and pointers, by means of a white or colored side light from each individual instrument.

It is also known to recess the scales on a nontransparent or on a very slightly transparent dial and to illuminate the scales from the backside. In particular in complete darkness, the scales appear then, however, too bright, and furthermore an additional illumination is required for the pointer. It has been finally also proposed, to produce a dial of completely or partly transparent material, wherein nontransparent scales appear dark or transparent scales appear bright, if illuminated from the backside.

All previously known solutions do not fulfill the problems posed by the present invention. The scales require either complicated and under circumstances health damaging ultraviolet illumination or they do not stand out clearly enough from the surrounding area, particularly at dusk, or they offer to the observer in one of the possible cases of illumination of the room, particularly in complete darkness, an impression which appears too bright. The well known disturbance of observation is caused, thereby, which is expressed such, that the individual measuring instruments appear veiled and the observer has the impression of dancing bright spots. This physiological disturbance of the observation capacity is called "white-mice effect" in the pilots' language or "to see snakes."

It is another object of the present invention to provide a pointer measuring instrument, wherein a translucent dial is used, which can be illuminated from the backside or which, in a particular application, applies a self-illuminating plate as a dial, on which a layer of covering material with recesses of the graduations, digits and symbols of the dial is applied, whereby the layer of covering material consists of a screen of substantially equally strong crossing, nontransparent dark colored lines formed of opaque material forming an open grid on said transparent material, whose specific light transmittancy the specific light transmittancy of which lines in proportion to the specific light transmittancy of all graduations, digits and symbols of the dial, which are recessed in a layer of paint material or in the screen, is smaller. The total quantity of light passing through the covering layer as ground color of the dial is, thereby, smaller than the quantity of light emitted through all graduations, digits and symbols.

A dark, but translucent layer of a paint material, thus a microscreen, is more difficult to produce in a series production of such dials with uniform light transparency, than a defined fine screen of crossing nontransparent lines. Tests have shown that the required proportion of the translucent quantity of light in case of the usual dimensions of the graduations, as well as of the digits and symbols can be obtained by a screen of a fineness in very predetermined limits, which can be comparatively easily produced and which consists of crossing nontransparent lines of approximately the same width, which are arranged at intervals corresponding approximately to the width of the lines and which has not more than twelve and not less than six, but preferably nine light-transmissive points per $mm.^2$. The screen must be so fine, that it appears as a compact dark or black background of the dial in incident light, thus in daylight or artificial room illumination, that its brightness becomes somewhat greater in twilight or at dusk in proportion with the decreasing room light, and it appears brighter in darkness only to such an extent, that as well the transparent symbols of the dial as also the pointer, which moves over the symbols and which is not illuminated, stand clearly out. For the improvement of the contrast between the screen and the symbols of the dial, it is of advantage to frame the individual graduations, digits and symbols in known manner by means of a closed nontransparent and dark colored line on the screen and also the contour of the bright colored pointer by means of a dark rim.

Extensive tests have shown, that this design of the dial and of the pointer represents the optimum solution for all lighting conditions with translucent light, which excludes physiological disturbances of observation and can be produced comparatively easily and economically. It makes possible now the application of falling through light, since in case of a nontransparent covering of the transparent dial, the pointer would not be visible in darkness, whereas a bright transparent background and nontransparent dial symbols are unsuitable for a multiple arrangement of instruments, as is known from experience.

Moreover the design according to the present invention permits for the first time a simple and economical application of electroluminescence for meausring instruments. Up to now the symbols of the dial have been produced as an electroluminescent conductor network or the symbols have been made from electroluminescent material between surface electrodes. Yet the application was prevented due to the insufficient contrast between the pointer and the dial and the poorly defined contours of the dial symbols, which result from the arrangement in layers and from the scattering of the electrostatic field. An electroluminescent pointer, which is necessary for such dials cannot be produced or at least, due to the supply of the high electrode potential through the movable pointer spindle, only at prohibitive costs.

The design of the dial and of the pointer according to the present invention, on the other hand, renders it possible to use a thoroughly electroluminescent plate merely as background illumination and to exclude all difficulties arising in connection with the attainment of sharp contours of the dial symbols and with the illumination of the pointer.

With these and other objects in view, which will become apparent in the following detailed description, the present invention will be clearly understood in connection with the accompanying drawings, in which.

Figure 1:
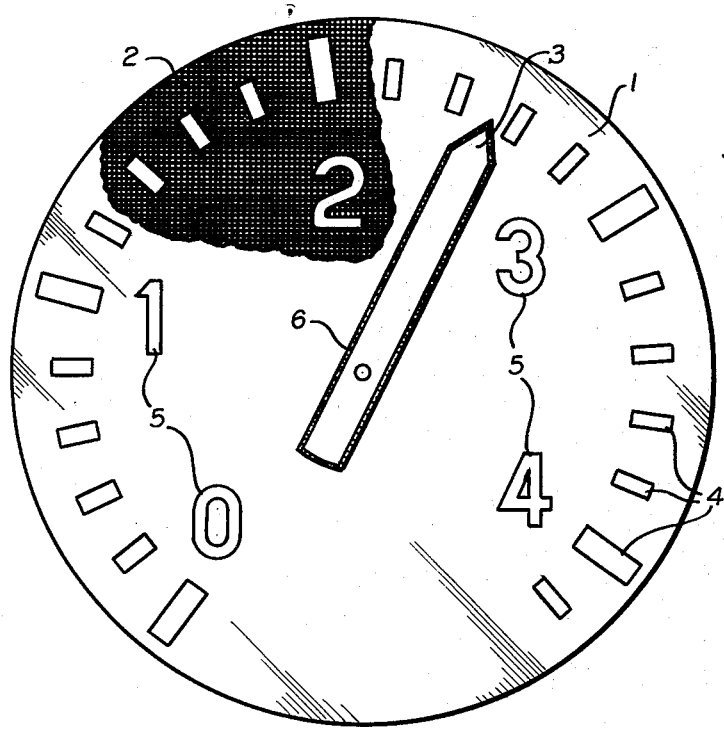
FIGURE 1 is a front elevation of a dial and a pointer, designed in accordance with the present invention.
Figure 2:
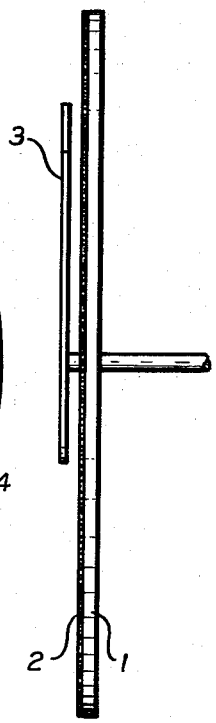
FIG. 2 is a side elevation thereof.

Referring now to the drawing, the dial comprises a disc 1 of transparent white or lightly colored material, which is illuminated from the backside of the disc 1 or which may also comprise a thoroughly electroluminescent plate.

According to the present invention, a screen 2 is attached to the disc 1. FIG. 1 shows the screen 2 partly broken away for the purpose of a better showing of the screen 2 in connection with the disc 1, according to the present invention. Graduations 4, digits 5 or other symbols of the dial are recessed in the screen 2. The latter is preferably attached as a film of suitable material to the disc 1.

A bright-colored pointer 3 having a marked margin 6 around its outer contour moves in front of the dial.

Figure 3:
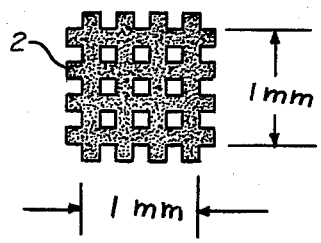
FIG. 3 is a front elevation of the screen, shown at a considerably enlarged scale.

FIG. 3 discloses, considerably enlarged, the screen 2 in the right proportion with preferably nine light-transmissive points on one square millimeter, yet it has been found that the screen may contain not more than twelve and not than six light-transmissive points per square millimeter. It is further preferred to make the lines of the screen of a thickness which is substantially equal to the distance between two adjacent lines.

While we have disclosed one embodiment of the present invention, it is to be understood that this embodiment is given by example only and not in a limiting sense, the scope of the present invention being determined by the objects and the claims.

We claim:

1. A dial for a pointer indicating instrument, comprising
   a disc of transparent material,
   a layer of light transmitting material covering one face of said disc,
   said layer having recesses to form indicia on said disc, the specific transmitting of light through said layer being lower than the transmittancy of light through said indicia, and
   said layer of covering material comprising a screen of a plurality of intersecting, nontransparent and dark-colored lines formed of opaque material of substantially equal width and disposed spaced apart from each other at a distance about equal with the width of said lines.

2. The dial, as set forth in claim 1, wherein
   said indicia have a nontransparent and dark-colored margin line of opaque material, and which includes a bright-colored pointer mounted for rotation in front of said disc and having a dark-colored margin of opaque material.

3. The dial, as set forth in claim 1, wherein
   said screen has no more than twelve and no less than six light-transmitting points per square millimeter of said screen.

4. The dial, as set forth in claim 1, wherein said screen comprises a film of light passing material applied to said disc.

References Cited by the Examiner

UNITED STATES PATENTS

| | | | |
|---|---|---|---|
| 782,285 | 2/1905 | Souder | 240—46.51 |
| 1,252,193 | 1/1918 | Staples | 240—46.51 |
| 1,414,628 | 5/1922 | Curtz | 116—129 |
| 1,709,951 | 4/1929 | Richardson | 240—46.51 |
| 1,917,079 | 7/1933 | Adams | 116—129 |
| 1,967,140 | 7/1934 | Ainslie | 240—46.51 |
| 2,023,934 | 12/1935 | Moise | 116—129 |
| 2,040,119 | 5/1936 | Baxter | 116—129 |
| 2,097,122 | 10/1937 | Hotchner | 58—50 |
| 2,108,342 | 2/1938 | Le Fevre | 116—129 |
| 2,251,021 | 7/1941 | Nebergall | 58—126 |
| 2,306,387 | 12/1942 | Huntley | 40—135 |
| 2,365,034 | 12/1944 | Wirtz | 40—135 |
| 2,792,803 | 5/1957 | Hardesty | 116—129 |
| 2,846,970 | 8/1958 | Dupree | 116—129 |
| 2,858,632 | 11/1958 | Caserico et al. | 116—129 |
| 2,878,394 | 3/1959 | Kowry | 250—80 |
| 3,054,054 | 9/1962 | Donker | 324—155 |
| 3,066,643 | 12/1962 | Flanagan | 116—136.5 |
| 3,071,105 | 1/1963 | Wertheimer | 116—129 |

FOREIGN PATENTS

| | | |
|---|---|---|
| 684,029 | 12/1952 | Great Britain. |
| 686,858 | 2/1953 | Great Britain. |
| 719,398 | 12/1954 | Great Britain. |
| 217,355 | 3/1942 | Switzerland. |

LOUIS J. CAPOZI, *Primary Examiner.*